(12) United States Patent
Osofsky

(10) Patent No.: US 9,390,525 B1
(45) Date of Patent: Jul. 12, 2016

(54) GRAPHICAL REPRESENTATION OF FRAME INSTANCES

(75) Inventor: Michael Jacob Osofsky, Palo Alto, CA (US)

(73) Assignee: NetBase Solutions, Inc., Mountain View, CA (US)

(*) Notice: Subject to any disclaimer, the term of this patent is extended or adjusted under 35 U.S.C. 154(b) by 491 days.

(21) Appl. No.: 13/176,713

(22) Filed: Jul. 5, 2011

(51) Int. Cl.
*G06T 11/20* (2006.01)
*G06F 17/27* (2006.01)

(52) U.S. Cl.
CPC .............. *G06T 11/206* (2013.01); *G06F 17/27* (2013.01)

(58) Field of Classification Search
CPC ................................................. G06T 11/206
USPC ......................................................... 345/440
See application file for complete search history.

(56) References Cited

U.S. PATENT DOCUMENTS

| | | |
|---|---|---|
| 5,694,523 A | 12/1997 | Wical |
| 5,940,821 A | 8/1999 | Wical |
| 5,963,940 A | 10/1999 | Liddy et al. |
| 6,202,064 B1 | 3/2001 | Julliard |
| 6,675,159 B1 | 1/2004 | Lin et al. |
| 6,774,899 B1 | 8/2004 | Ryall et al. |
| 7,496,593 B2 | 2/2009 | Gardner et al. |
| 7,779,007 B2 | 8/2010 | West et al. |
| 7,805,302 B2 | 9/2010 | Chelba et al. |
| 8,046,348 B1 | 10/2011 | Rehling et al. |
| 8,055,608 B1 | 11/2011 | Rehling et al. |
| 8,745,054 B1 | 6/2014 | Hsu et al. |
| 2002/0091671 A1 | 7/2002 | Prokoph |
| 2003/0172061 A1 | 9/2003 | Krupin et al. |
| 2003/0216905 A1 | 11/2003 | Chelba et al. |
| 2004/0044952 A1 | 3/2004 | Jiang et al. |
| 2004/0078190 A1 | 4/2004 | Fass et al. |
| 2005/0041027 A1* | 2/2005 | Chickering et al. .......... 345/440 |
| 2005/0149494 A1 | 7/2005 | Lindh et al. |
| 2005/0165600 A1 | 7/2005 | Kasravi et al. |
| 2007/0156677 A1 | 7/2007 | Szabo |
| 2009/0327259 A1* | 12/2009 | Smith .............................. 707/5 |
| 2010/0063785 A1* | 3/2010 | Pich et al. ......................... 703/6 |
| 2010/0145771 A1* | 6/2010 | Fligler et al. .................... 705/10 |

(Continued)

OTHER PUBLICATIONS

Schwing, "The Flux Measure of Influence in Engineering Networks," Sep. 2009, MIT, pp. 1-3 and 15-28.*

(Continued)

*Primary Examiner* — Ryan D McCulley
(74) *Attorney, Agent, or Firm* — Kaplan IP Law, PLLC; Jonathan T. Kaplan

(57) ABSTRACT

The following graphical representations, of frame instance data, are presented: Instance Graph and Instance Plot. An Instance Graph is a kind of directed graph that represents directed relationships between items, as established by frame instances. An example frame is the Preference Frame, as applied to online opinion data. The degree or "influence" of a node can be graphically indicated. Multiple edges, between two nodes, can be represented as a compound edge. Each node can be modeled as having a field, causing it to repel all other nodes, which each edge can be modeled as producing an attractive force. The "net preference" of a node is the difference between its outdegree and indegree. From the "influence" and "net preference" values, for nodes of an Instance Graph, an Instance Plot can be produced. One axis of an instance plot is based on "influence" and another axis is based on "net preference."

6 Claims, 14 Drawing Sheets

(56) References Cited

U.S. PATENT DOCUMENTS

2011/0037766 A1* 2/2011 Judy et al. ............... 345/440
2013/0135314 A1* 5/2013 Haggerty et al. ......... 345/440

OTHER PUBLICATIONS

Cardie et al. "Combining Low-Level and Summary Representations of Opinions for Multi-Perspective Question Answering." New directions in question answering. 2003.*

Huang et al. "On-line animated visualization of huge graphs using a modified spring algorithm." Journal of Visual Languages & Computing 9.6 (1998): 623-645.*

Gautam et al., published Feb. 17, 2008 (y/m/d), "Document Retrieval Based on Key Information of Sentence," IEEE ICACT, pp. 2040-2042.

"FrameNet II: Extended Theory and Practice," Ruppenhofer et al., International Computer Science Institute, University of California at Berkeley, USA. Aug. 25, 2006. 166 pages.

Wu, Tianhaow; et al., published May 3, 2003 (y/m/d), "A Supervised Learning Algorithm for Information Extraction From Textual Data," Proceedings of the Workshop on Text Mining, Third SIAM International Conference on Data Mining. 12 pgs.

Zadrozny, Slawomir; et al., published 2003, "Linguistically quantified thresholding strategies for text categorization," Systems Research Institute, Polish Academy of Sciences, Warszawa, Poland. 5 pgs.

Cantador et al., published Sep. 7, 2009 (y/m/d), "Measuring Vertex Centrality in Co-occurrence Graphs for Online Social Tag Recommendation," European Conference on Machine Learning and Principles and Practice of Knowledge Discovery in Databases (ECML/PKDD) Discovery Challenge 2009.

Ku et al., published Mar. 27, 2006 (y/m/d), "Opinion Extraction, Summarization and Tracking in News and Blog Corpora," AAAI Spring Symposium Series 2006.

Zhang et al., published Jun. 22, 2010 (y/m/d), "Voice of the Customers: Mining Online Customer Reviews for Product Feature-based Ranking," Proceedings of the 3rd Wonference on Online social networks (WOSN '10). USENIX Association, Berkeley, CA, USA.

* cited by examiner

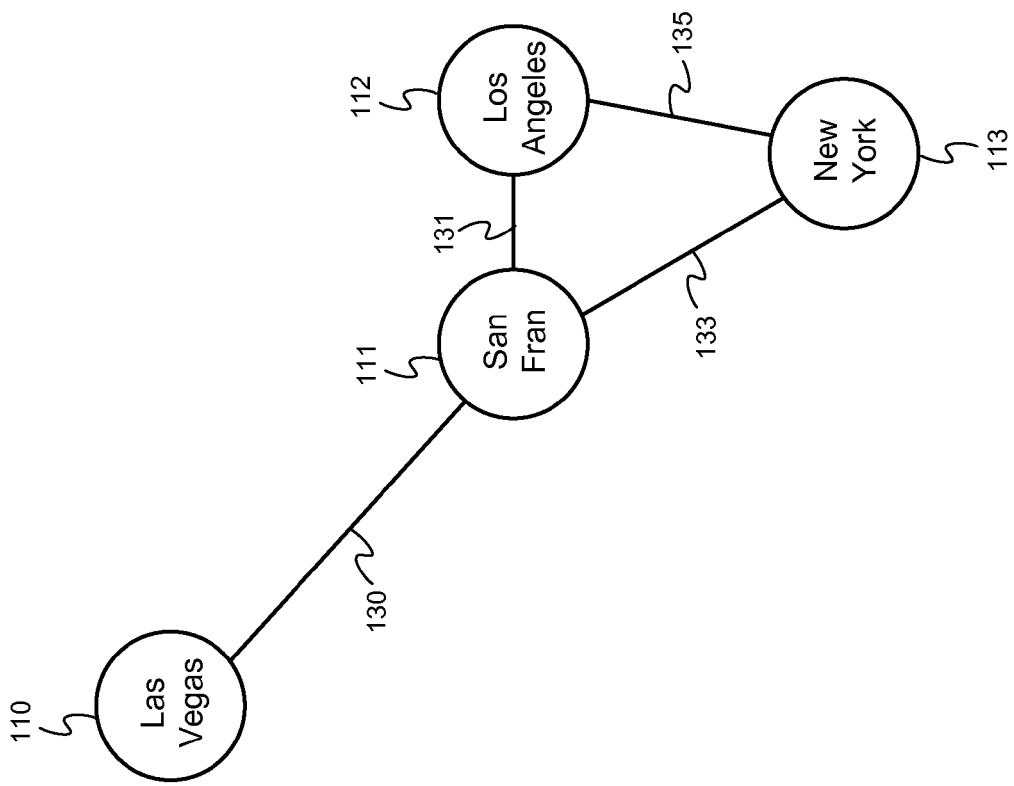

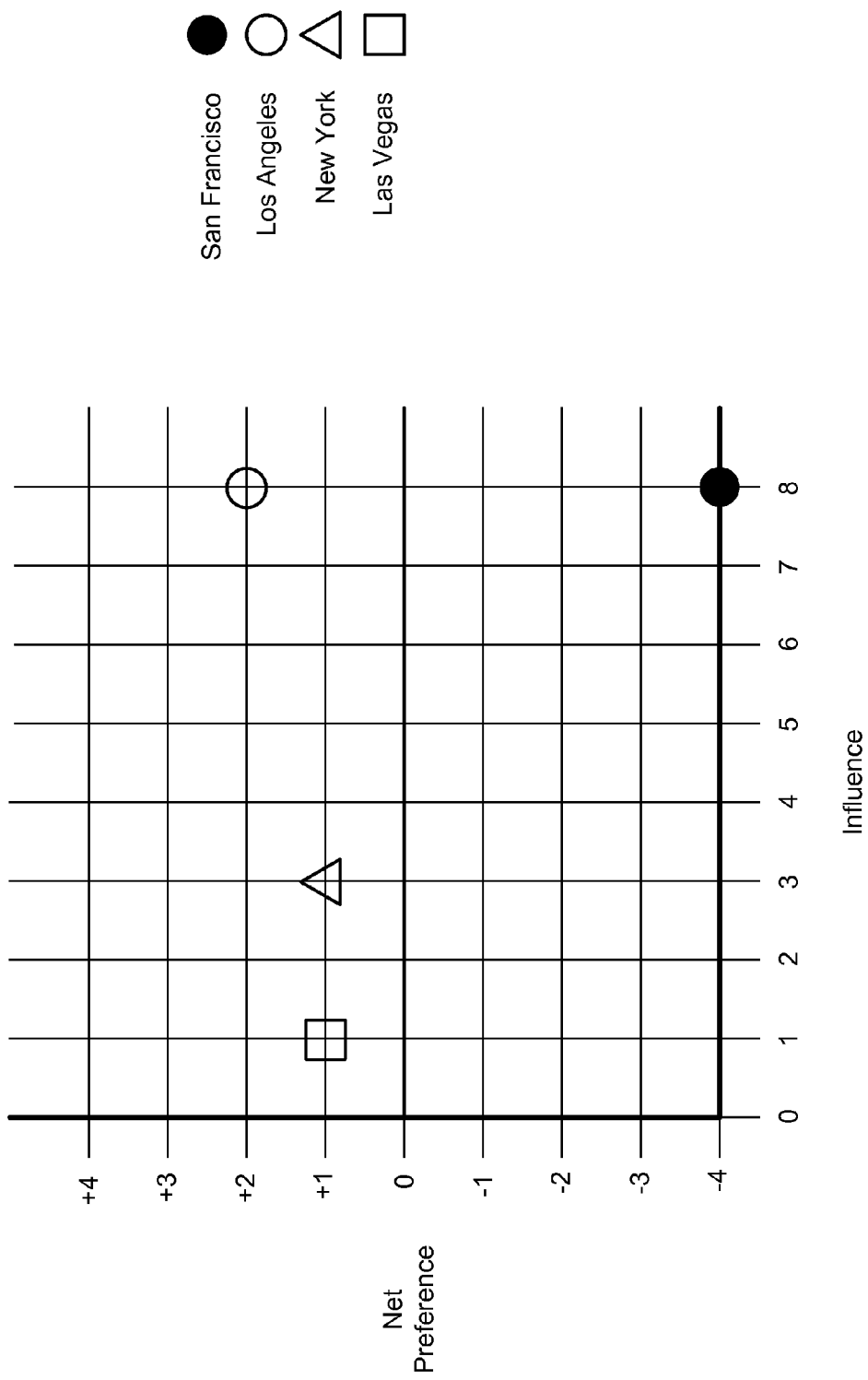

FIGURE 2A
Example Corpus

SNIPPET 201 (SF over LA):
>According to a soon to be released report from Environment California, San Francisco has the largest amount of solar rooftops per capita of any large California city. Currently, San Francisco has 1,350 solar roofs totaling 7,050 mw of solar power, ranking San Francisco third, behind Los Angeles and San Diego, in terms of sheer numbers of solar roofs. <u>But, on a per capita basis, San Francisco has approximately six times more solar roofs than Los Angeles, despite Southern California receiving more sun.</u> "The success of our solar energy incentive program in just its first year has helped catapult San Francisco into a leading solar city in California," said SFPUC General Manager Ed Harrington. "GoSolarSF is proof that, with fiadded incentives, people will enthusiastically embrace solar power and give a boost to California's environment and economy."
>
>Source: http://www.sfha.org/news/pdf/
>07_07_09_SFHA_Solar_Panels_Press_Release.pdf SNIPPET 202 (SF over LA):
>\* Hundreds of media stories will be shared internationally about San Francisco, which will attract visitors. \* Provide local independent filmmakers the opportunity to forge co-production relationships with their global counterparts, which will bring hundreds of thousands of dollars in production and post-production expenditures to San Francisco. <u>(San Francisco has more independent filmmakers than Los Angeles and New York.)</u> \* Bring repeat visitors. Conference attendees will likely visit San Francisco again.
>
>Source: https://netaonline.org/JudyTamINPUT2005.pdf SNIPPET 203 (LA over SF):
>He lost a second bid for governor in 1986. The five-term mayor (1973-93) was credited with opening city government to minorities and women, expanding social services to the urban poor, and spurring economic growth. <u>Under his administration, Los Angeles surpassed San Francisco as the West Coast's economic power in Pacific Rim trading, symbolized by the downtown skyline that grew during his administration.</u> The successful 1984 Olympic Games stood out as his crowning achievement. The economic ruin and traffic gridlock many feared never materialized.
>
>Source: http://www.rulers.org/indexb5.html

FIGURE 2B
Example Corpus (cont)

SNIPPET 204 (LA over SF):
I hate to say it, but Los Angeles has better sushi than San Francisco. Sure, the Bay Area has a smattering of top notch sushi bars, but in L.A. you can go to a random strip mall.

Source: http://www.bunrab.com/dailyfeed/2007February/dailyfeed_february-07_p2.html SNIPPET 205 (LA over SF):
So, who's moving in? A close analysis of the 2000 census finds that the area continues to attract large numbers of well-educated, younger residents. Even Los Angeles has surprisingly outperformed such cities as San Francisco and San Jose in the years between 1995 and 2004. How does this affect Santa Monica? It's a highly sought-after residential city within the Los Angeles area.

Source: http://www.lwvsantamonica.org/files/traffic.pdf

SNIPPET 206 (LA over SF):
But the promise of international commerce on a grand scale would be delayed until the end of the World War I. The 1920s, marked by a boom in petroleum, lumber and citrus trade, was a period of dynamic growth for the Port of Los Angeles. For the first time in history, Los Angeles surpassed San Francisco as the West Coast's busiest seaport and ranked second only to New York in foreign export tonnage. In the peak year of 1928, the Port handled 26.5 million tons of cargo -- a record that would stand for nearly 40 years. The Great Depression caused cargo tonnage to slump severely, and the Port did not pass 20 million tons again until 1937.

Source: http://www.portoflosangeles.org/history/cabrillo.asp

SNIPPET 207 (LA over NY):
"If you cut open my stomach, you'll see giant globs of hydronated purple stuff." * Is a huge old movie buff and stops at 1962 (after Doris Day, she says). * Overall prefers Los Angeles to New York City - although she loved living on Charles Street in the West Village, while dating Men's Health editor-in-chief Dave Zinczenko. She isn't a fan of the cold weather - or all the snobs: "I just hate it, I can't bear it. I find it to be as small-minded as any other small-minded town.

Source: http://www.rose-mcgowan.com/information/trivia.php

FIGURE 2C
Example Corpus (cont)

SNIPPET 208 (NY over LA):
New York City has a higher number of Asian same-sex households than San Francisco or Los Angeles, according to a report released yesterday. The report, analyzing Census 2000 data, showed that 17,163 same-sex households in the United States were headed by an Asian. They represent 0.5 percent of all Asian households.

Source: http://www.gaypasg.org/GayPASG/PressClippings/2004/March%25202004/NYC%2520has%2520high%2520number%2520of%2520Asian%2520same-sex%2520households.htm SNIPPET 209 (NY over SF):
I arrived in a boiling NYC, the weather as fabulous as I left it 32 days previously. Looking back, the west coast was nothing compared to the east. I much preferred New York to LA or San Francisco, which surprised me greatly. My hotel was in the Murray Hill area, mid-town and a perfect location.

Source: http://www.americansc.org.uk/Online/Helens_Trek_America.htm

SNIPPET 210 (LV over SF):
In upcoming campaigns, the Las Vegas Convention and Visitors Authority (LVCVA) plans to punctuate its marketing programs with the launch of a multi-faceted campaign specifically targeting the gay and lesbian traveler. "Millions of gay and lesbian travelers are drawn to Las Vegas each year because they crave the Las Vegas experience," says Terry Jicinsky, senior vice president of marketing, LVCVA. "The fact Las Vegas beat out San Francisco, which was once thought of as the preferred destination for this market, shows Las Vegas is making great strides in attracting a diverse audience." Las Vegas offers a multitude of once-in-a-lifetime experiences, including the hottest gourmet restaurants by celebrity chefs including Bobby Flay, Hubert Keller, Rick Moonen and Daniel Boulud, as well as unparalleled headliners and productions year-round such as "MAMMA MIA!" at Mandalay Bay, "Jubilee!" at the Tropicana and Celine Dion's "A New Day ...

Source: http://www.lasvegastravelmagazine.com/content/view/177/39/

FIGURE 3A
Example Instances For Graphing

301

| ITEM | Los Angeles |
|---|---|
| PREF ITEM | San Francisco |

302

| ITEM | Los Angeles |
|---|---|
| PREF ITEM | San Francisco |

303

| ITEM | San Francisco |
|---|---|
| PREF ITEM | Los Angeles |

304

| ITEM | San Francisco |
|---|---|
| PREF ITEM | Los Angeles |

305

| ITEM | San Francisco |
|---|---|
| PREF ITEM | Los Angeles |

306

| ITEM | San Francisco |
|---|---|
| PREF ITEM | Los Angeles |

FIGURE 3B
Example Instances For Graphing (cont)

307

| ITEM | New York |
|---|---|
| PREF ITEM | Los Angeles |

308

| ITEM | San Francisco |
|---|---|
| PREF ITEM | New York |

309

| ITEM | Los Angeles |
|---|---|
| PREF ITEM | New York |

310

| ITEM | San Francisco |
|---|---|
| PREF ITEM | Las Vegas |

Example Instances For Graphing

FIGURE 5A

PREFERENCE FRAME: EXAMPLE RULE

500

1. PREFER_A_OVER_B_Rule

2. Root_node: PREFER --> no_role
3.     Undergoer: ANY_LEX_UNIT --> PREFERRED_ITEM_ROLE
4.     Complement: Prep(OVER)... NP --> ITEM_ROLE

FIGURE 5B

EXAMPLE SENTENCE FOR CONVERSION TO LOGICAL FORM

501

"I actually prefer BFTiE way over TBE."

FIGURE 5C

LOGICAL FORM FROM SEMANTIC PARSER

502

1. "prefer"
2.     Actor: I
3.     Undergoer: BFTiE
4.     Complement: way over TBE

FIGURE 5D

PREFERENCE FRAME INSTANCE

503

1. ITEM_ROLE: way over TBE
2. PREFERRED_ITEM_ROLE: BFTiE

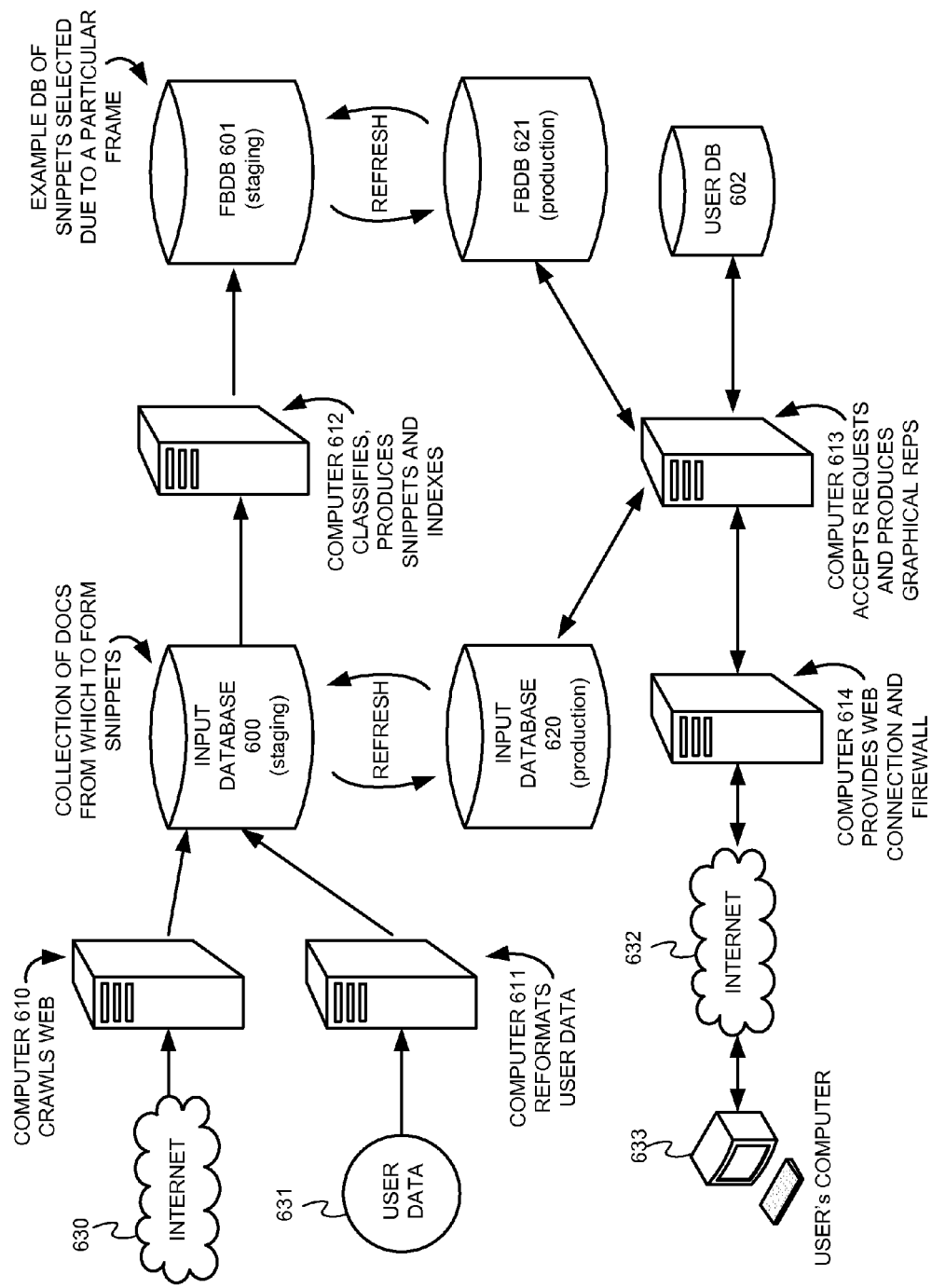

GRAPHICAL REPRESENTATION OF FRAME INSTANCES

CROSS REFERENCE TO RELATED APPLICATIONS

This application is related to the following U.S. patent application(s), which are herein incorporated by reference in their entirety:

"Method and Apparatus For Frame-Based Search," filed 2008 Jul. 21 (y/m/d), having inventors Wei Li, Michael Jacob Osofsky and Lokesh Pooranmal Bajaj and application Ser. No. 12/177,122 ("the '122 Application");

"Method and Apparatus For Frame-Based Analysis of Search Results," filed 2008 Jul. 21 (y/m/d), having inventors Wei Li, Michael Jacob Osofsky and Lokesh Pooranmal Bajaj and application Ser. No. 12/177,127 ("the '127 Application");

"Method and Apparatus For Automated Generation of Entity Profiles Using Frames," filed 2009 Jul. 20 (y/m/d), having inventors Wei Li, Michael Jacob Osofsky and Lokesh Pooranmal Bajaj and App. No. 61/227,068 ("the '068 Application"); and "Method and Apparatus For HealthCare Search," filed 2010 May 30 (y/m/d), having inventors Jens Erik Tellefsen, Michael Jacob Osofsky, and Wei Li and application Ser. No. 12/790,837 ("the '837 Application").

FIELD OF THE INVENTION

The present invention relates generally to graphical representations of frame instances, and more particularly to representing instances produced as a result of applying frames to a corpus of natural language.

BACKGROUND OF THE INVENTION

Vast amounts of opinion data is now available on the Internet, through a wide range of web sites that permit users to provide input, and the amount of such opinion data continues to increase rapidly. This opinion data could be of great use, beyond the particular web site for which it was created, if it could be "harvested" (or collected) and summarized in a useful way. For example, persons involved in the marketing or management of a brand "x" have a great interest in knowing what people think about brand "x" in relation to other brands.

It would therefore be highly desirable to provide a system that can process and summarize opinion data in an automated way.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 1C represents the set of all edges, between a pair of nodes of FIG. 1B, by a single edge, for purposes of the determination of an attractive force.

FIG. 1E illustrates an example Instance Plot.

FIGS. 2A-2C illustrate example "snippets," collected from a variety of online sources.

FIGS. 3A-3B show a corresponding Preference Frame instance, for each snippet of FIGS. 2A-2C.

FIG. 5A shows an example frame extraction rule 500 for producing instances of the Preference Frame.

FIG. 5B shows an example input sentence 501, that is converted into a representation called "Logical Form."

FIG. 5C show an example Logical Form, produced from the example input sentence of FIG. 5B.

FIG. 5D show an example instance, produced the Logical Form of FIG. 5C being tested against the frame extraction rule FIG. 5A.

FIG. 6 depicts an example production-level computer system design in which the techniques described herein can be applied.

DETAILED DESCRIPTION OF PREFERRED EMBODIMENTS

Reference will now be made in detail to various embodiments of the invention, examples of which are illustrated in the accompanying drawings. Wherever possible, the same reference numbers will be used throughout the drawings to refer to the same or like parts.

1 Introduction

The description presented herein relies on many parts of the '837 Application. In general, sections of the '837 Application can be referred to herein by the following convention. Where "X" is a section number, the section can be referred to as: Section X, '837. If the title of the section is to be included, where the title is "Title," it can be referred to as: Section X, '837 ("Title") or Section X, '837, "Title." Figures of the '837 Application can be referred to herein by the following convention. Where "X" is a figure number, the Figure X can be referred to as: Figure X, '837.

Section 4, '837 ("FBSE") describes a Frame-Based Search Engine (or FBSE). Section 4.2, '837 discusses frames as a form of concept representation (Section 4.2.1) and the use of frame extraction rules to produce instances of frames (Section 4.2.2). A pseudo-code format for frame extraction rules is presented in Section 6.2, '837 ("Frame Extraction Rules").

As used herein, "frame instance data" refers to any collection of instances produced by the application of frame extraction rules to a corpus of natural language. Frame instance data can be produced in a wide variety of ways, some of which are discussed in the '122, '127, '068, and '837 Applications (cited above).

A system that produces frame instance data is referred to herein, generically, as a "frame instance system." An example frame instance system, based on the '837 Application, is included in the remaining portion of this section.

However it is produced, a graphical representation, of frame instance data, can be very useful to persons seeking to better understand it. In the following two sections, two types of graphical representation are introduced:

1. Instance Graph
2. Instance Plot

Each of the following sections explains one of these graphical representations through an example usage scenario. The usage scenario is as follows: a person or organization seeking to better understand preferences between "items" of a certain category. In this context, "item" is understood very broadly and includes anything that can be referenced by a noun.

A more specific example is the study of consumer-preferences between brands, where the brands all relate to a same category of product or service. Some example product categories (in no way intended to be limiting) follow:

Soft drinks

Disposable diapers

Cell phones

An important commonality, to each category of product or service, is that it represent a competitive market, so that persons or organizations, with marketing and/or brand-management responsibilities, have an interest in understanding customer preferences.

Figure 4:
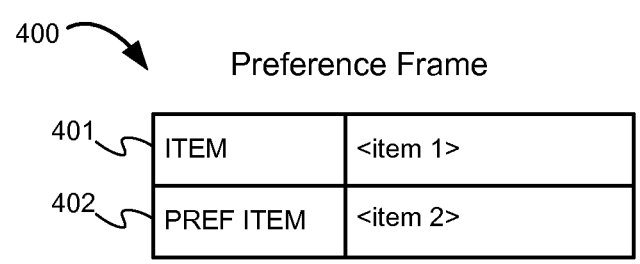
FIG. 4 shows an example Preference Frame.

To accomplish the production of frame instance data regarding items within a category, from a corpus of natural language such as online opinion data, a "Preference Frame" is introduced. An example Preference Frame 400 is shown in FIG. 4. It consists of two roles (or attributes) 401 and 402 called, respectively, "Item" and "Preferred Item." Frame extraction rules are written so that when a preference for one item over another is expressed, in a corpus of natural language, the following occurs:

The preferred item, represented by <item 2>, is assigned to the role "Preferred Item."

The item with respect to which <item 2> is preferred, represented by <item 1>, is assigned to the role "Item."

Another specific example where the Preference Frame can be useful, and that is addressed in detail herein, is the following category: major cities of the USA. For purposes of a simplified example, only the following 4 cities are considered:

1. Las Vegas
2. Los Angeles
3. New York
4. San Francisco

An example collection of data about the 4 above-listed example cities, that has been collected from a variety of online sources, is shown in FIGS. 2A-2C. These figures depict 10 "snippets", numbered 201-210. Each snippet includes the URL at which it was collected. ("Snippets," discussed further below, are also defined in Section 6.4, '837, "Snippet Formation.")

For each of snippets 201-210, FIGS. 3A-3B shows a corresponding Preference Frame instance 301-310. Each instance is produced from the focus sentence of its corresponding snippet, the focus sentence indicated in FIGS. 2A-2C by underlining.

The basic structure, of the FBSE described by Section 4, '837, is depicted in FIG. 11A, '837. This structure can be modified, as follows, in order to produce the frame instance data of FIGS. 3A-3B.

1. Frame Extraction Rules 1103 can be rules designed to produce instances of the Preference Frame (i.e., each rule can be triggered upon detection of some kind of expression of a preference, for one item over another). FIG. 5A shows an example frame extraction rule 500 for producing instances of the Preference Frame. This rule (discussed further below) is in the pseudo-code format defined in Section 6.2, '837 ("Frame Extraction Rules").
2. Source Corpus 1102 can be online opinion data, from any suitable source.

With these two changes, a "Frame-Based Database" (FBDB) based on the Preference Frame can be constructed, during pre-query processing, as described in Section 4.3.2 ("Pre-Query Processing"), '837. The FBDB can be referred to as FBDB(Preference Frame) where, in accordance with the terminology of Section 4.3.2.1 ("Overview"), '837, the Preference Frame is the "Organizing Frame" of the FBDB.

By searching the FBDB(Preference Frame) with an appropriate query or queries, a particular kind of preference can be studied. Searching the FBDB produces a Query-Selective Corpus, as is addressed by Section 4.3.3 ("Post-Query Processing"), '837. The Query-Selective Corpus is comprised of snippets, such as those depicted in FIGS. 2A-2C. An Instance Superset 1105 can then be produced from the Query-Selective Corpus, with a possible Instance Superset being, for FIGS. 2A-2C, the instances of FIGS. 3A-3B. For example, Query 1101, of FIG. 11A, '837, can consist of the names of the following four cities (sought for comparison) where matching on any one of the city names is sufficient: San Francisco or Los Angeles or New York or Las Vegas.

The step "Instance Merging 1120" (described in Section 4.4, '837), and its production of a "Merged Superset 1106," is deleted from the process of FIG. 11A, '837. (While the Instance Merging step is not used, parts of the step are useful for generating an Instance Graph, as is discussed in below Section 2.)

The result of removing Instance Merging step 1120 is that once an Instance Superset 1105 has been produced, by Instance Generation 1110, it is directly subjected to Instance Selection 1130, in order to produce a Search Result 1104 (where Search Result 1104, of FIG. 11A, '837, corresponds to the frame instance data that is subjected to the graphical techniques of below Sections 2 and 3).

Application of Instance Selection step 1130, described in Section 4.5 ("Instance Selection"), '837, can be accomplished by a re-application of the query or queries that produced the Query-Selective Corpus, with such queries being applied in a more focused way to the contents of role values. After the application of Instance Selection, frame instance data, suitable for generating an Instance Graph and/or Plot, is available. For the example presented herein, of studying preferences between four US cities, Instance Superset 1105 is treated as being the same as Search Result 1104: both are depicted by the instances of FIGS. 3A-3B

Now that it has been shown how the basic structure of the FBSE of the '837 Application can be modified, to the purpose of producing frame instance data, a more detailed discussion of rule 500 of FIG. 5A follows. Once again, as mentioned above, understanding the following discussion of rule 500 relies upon knowing the terminology of Section 6.2, '837 ("Frame Extraction Rules")

It can be seen that rule 500 has 4 lines, the first of which simply gives the rule a symbolic name, while each of lines 2-4 is a kind of sub-rule called a "Logical Form rule."

FIG. 5B shows an example input sentence 501 that is converted into a representation, called "Logical Form," shown in FIG. 5C. The Logical Form format is defined in Section 6.1, '837 ("Logical Form").

It is the Logical Form form of a sentence (such as Logical Form 502 of FIG. 5C) that is tested against a frame extraction rule (such as rule 500 of FIG. 5A) in order to produce an instance (such as instance 503 of FIG. 5D).

A line-by-line discussion, of lines 2-4 of frame extraction rule 500, follows.

Matching of the Logical Form 502, against the rule of FIG. 5A, begins by testing whether the Logical Form rule of line 2 is satisfied. Line 2 is satisfied if the root of a Logical Form matches the feature PREFER. PREFER is defined as follows:

PREFER: a class of verbs expressing preference of one object over another, including the following set of verbs: {prefer|favor|want|pick|select|go_for|go_with|stick_ with| ... }

As can be seen, the verb of line 1 of Logical Form 502 (the verb "prefer") does match the Logical Form rule of line 2.

The Logical Form rule of line 3 is satisfied as long as there is any lexical unit in the role of Undergoer in Logical Form 502, and the lexical unit "BFTiE" satisfies this. This lexical unit is known to indicate the Preferred Item and is therefore assigned to the PREFERRED_ITEM_ROLE of Preferred Frame instance 503 of FIG. 5D.

The Logical Form rule of line 4 is satisfied as long as there is, in the Complement role of Logical Form 502, a preposition (that matches the feature OVER) with a Noun Phrase. OVER is defined as follows:

OVER: a class of prepositions expressing a substitution of one item for another, including the following set of prepositions: {instead_of|way_over|over|than|rather than|to|over|more_than}

As can be seen, the Complement of line 4 of Logical Form 502 (the phrase "way over TBE") does match the Logical Form rule of line 4. This Compliment is known to indicate the Item, against which the Preferred Item is compared, and therefore the Compliment is assigned to the ITEM_ROLE of Preferred Frame instance 503.

The description herein focuses on the graphing of frame instance data produced from a single frame (the Preference Frame 400) with two roles (Preferred Item 402 and Item 401). However, it can readily be appreciated, by one of ordinary skill in the art, that the techniques presented herein can be applied to frame instance data that has one or both of the following characteristics:

produced from more than one frame produced from one or more frames, where at least one frame has more than two roles.

2 Instance Graph

A useful graphical representation, for understanding a collection of frame instance data, is a kind of directed graph referred-to herein as an "Instance Graph." As with directed graphs in general, an Instance Graph is comprised of nodes (or vertices) and directed edges. The particular type of directed graph addressed herein, however, has at least the following characteristics:

1. Each node of the graph represents at least one role value of one instance. If two or more role values are the same or sufficiently similar, such that they are determined to represent a same item, the nodes corresponding to such role values are merged. Such merging can be accomplished with the Matching Role Values techniques of Section 4.4.3, '837.

2. A single directed edge (referred to herein as a "simple edge") is added to represent one relationship, as established by an instance between its role values. However, if (as a result of node merging) two or more simple edges are between the same two nodes, the simple edges can be graphically represented by one "compound edge." A compound edge can appear the same as a simple edge, except it is graphically modified to be indicative of the number of simple edges it represents.

Figure 1A:
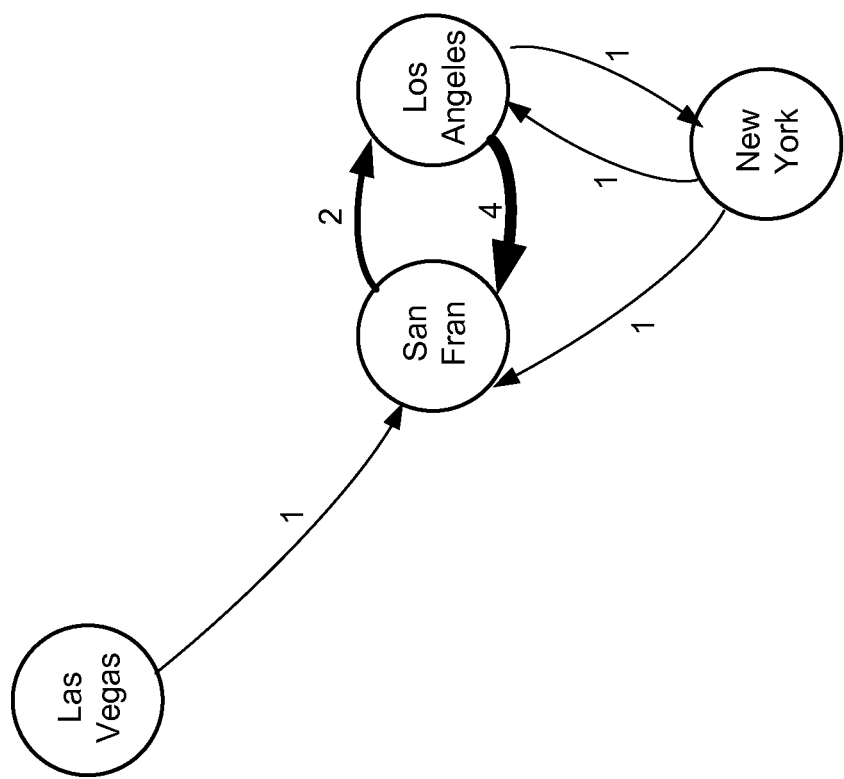
FIG. 1A depicts an example Instance Graph.
Figure 1B:
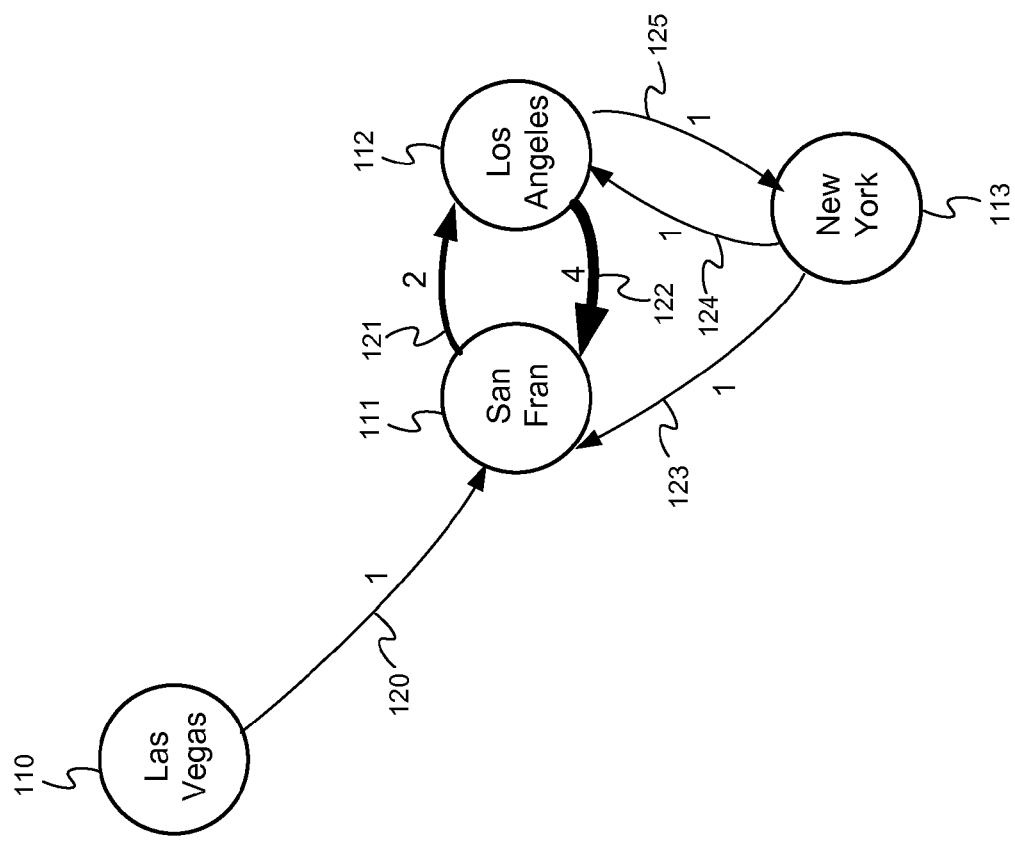
FIG. 1B is the same as FIG. 1A, except parts are labeled.

An example Instance Graph, for the instances of FIGS. 3A-3B, is shown in FIG. 1A. FIG. 1B is the same as FIG. 1A, except parts are labeled. FIG. 1B shows that each city is represented by a node 110-113. Preferences, between cities, are represented by directed edges 120-125. For each directed edge, the convention used is that the item at the edge's source is the value for the Preferred Item role (of a Preferred Frame instance), while the item at the target of the edge is the value for the Item role. (However, it can be readily appreciated that a reverse convention, where the edge's target is the Preferred Item and the edge's source is the Item, can be used.) As discussed in the above definition of an Instance Graph, an edge can represent more than one instance. The number of simple edges, represented by a compound edge, can be graphically indicated using any suitable technique, including one or both of the following:

Placing a number, indicative of the number of simple edges represented, in close proximity to the compound edge. For example, in FIG. 1B, 120 is a simple edge, 121 is compound (it represents the two relationships established by instances 301-302), and 122 is compound (it represents the four relationships established by instances 303-306).

Causing the thickness of an edge to be a function of (e.g., proportional to) the number of instances represented. For example, for FIG. 1B, the following edges have increasing thickness: 120, 121, and 122.

Figure 3C:
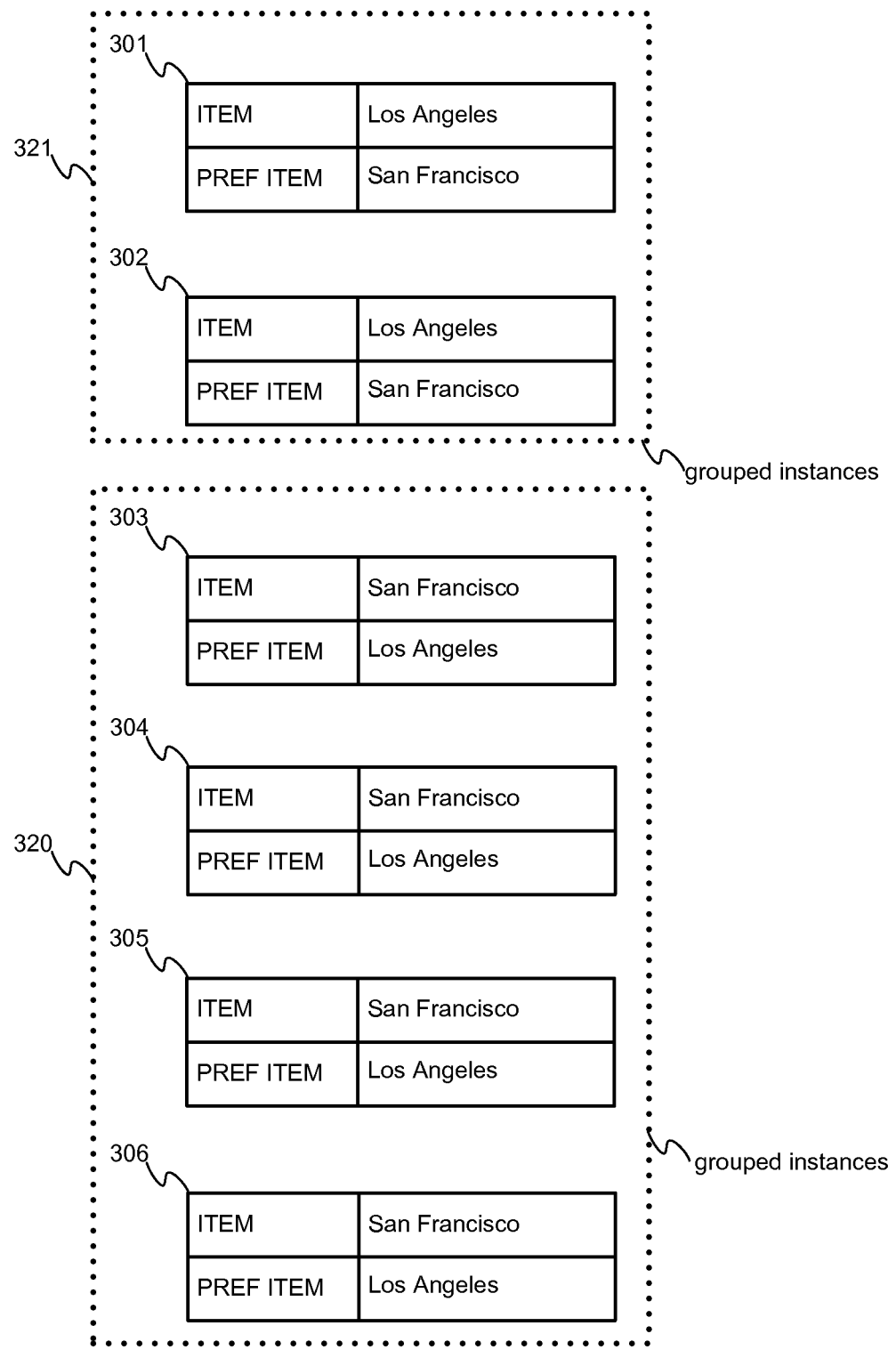
FIG. 3C is the same as FIG. 3B, except it introduces instance groups.

FIG. 3C is the same as FIG. 3A, except it introduces instance groups 321 and 320. Group 321 is represented by compound edge 121 and group 320 is represented by compound edge 122.

Automatic placement, of the nodes and edges of an Instance Graph, can be accomplished by the following procedure:

Model each node as producing a "field" (such as an electric field) that causes it to be repelled by all other nodes. For example, each node can be modeled as having a static electric "charge," of like polarity and amount.

For each pair of nodes ($N_x$, $N_y$), represent all simple edges of either direction, between them, by a set (called $All_{SE}$). Model an attractive force, between nodes ($N_x$, $N_y$), of a strength that is a function of (e.g., proportional to) the number of simple edges in $All_{SE}$. An example type of attractive force for modeling is the force profile of a mechanical spring.

The determination of an attractive force, between each pair of nodes of FIG. 1B, can be represented by the diagram of FIG. 1C. Each set of edges $All_{SE}$, between a pair of nodes of FIG. 1B, is represented by a single edge in FIG. 1C. For example, edge 120 of FIG. 1B is represented by edge 130 in FIG. 1C and edges 121-122 of FIG. 1B are represented by edge 131 in FIG. 1C. Each edge of FIG. 1C can be modeled as a spring, with an attractive force proportional to the number of instances it represents. For example, edge 131 can represent a spring that is 6× "stronger" than edge 130, since edge 130 represents 1 instance (the 1 instance of edge 120) while edge 131 represents 6 instances (the 2 instances of edge 121 plus the 4 instances of edge 122).

The placement of nodes and edges in FIG. 1B is a potential result of applying the above-described automatic placement procedure. The visualization of FIG. 1B, and the modeling of repulsive and attractive forces, can be accomplished with such data visualization toolkits as "flare." Flare is an ActionScript library for creating visualizations that run in the Adobe Flash Player. Flare is a creation of the Visualization Lab of the University of California at Berkeley.

For purposes of explaining further techniques to graphically present frame instance data, the following graph theory terminology is introduced:

Indegree: the total number of edges, coincident to a node, that are directed towards the node.

Outdegree: the total number of edges, coincident to a node, that are directed out from the node.

Degree: total number of edges, of either direction, coincident to a node.

The term "Degree" can also be described as "Influence," since it measures the number of times an item is the subject of an opinion, regardless of whether the role value is being mentioned positively (i.e., it is assigned to a Preferred Item role) or not (i.e., it is assigned to an Item role). The following Table I presents values, for each of these terms, for each node of FIG. 1B:

TABLE I

| Node | Outdegree | Indegree | Degree |
| --- | --- | --- | --- |
| San Francisco | 2 | 6 | 8 |
| Los Angeles | 5 | 3 | 8 |
| New York | 2 | 1 | 3 |
| Las Vegas | 1 | 0 | 1 |

Figure 1D:
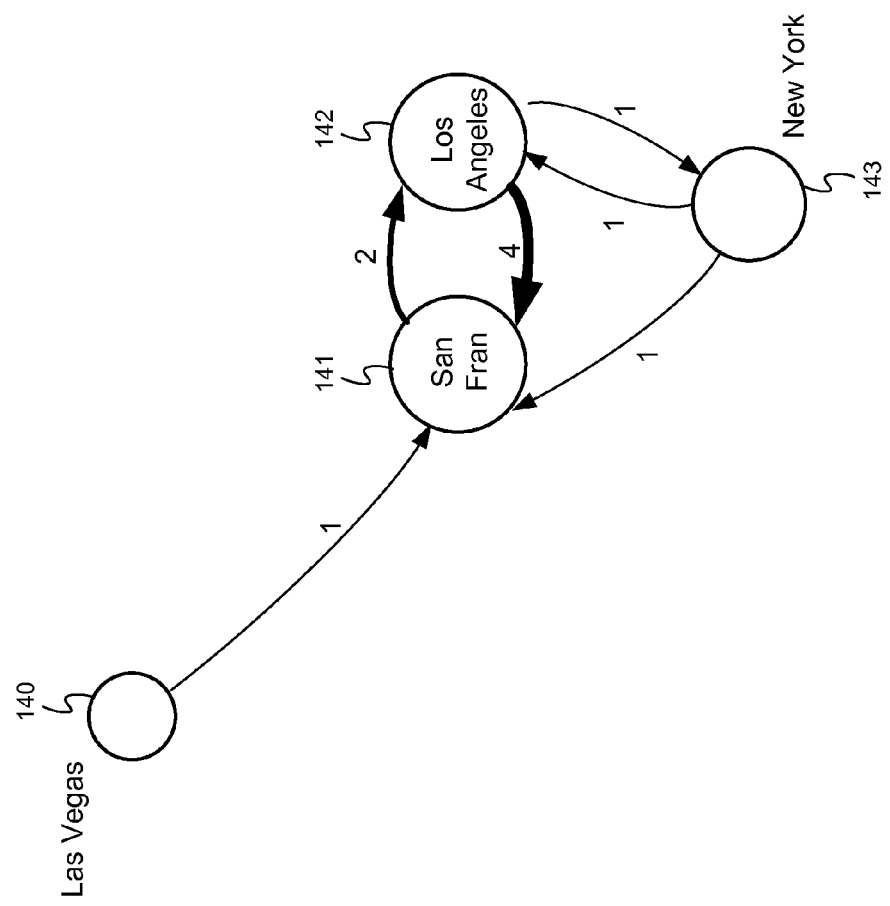
FIG. 1D is the same as FIG. 1B, except the diameter of a node is indicative of its degree.

When producing an Instance Graph, it can be useful to represent each node in a way that is visually indicative of its degree. For example, the diameter of a node can be a function of (e.g., proportional to) its degree. FIG. 1D is the same as FIG. 1B, except the diameter of a node is indicative of its degree. As can be seen, the nodes for San Francisco and Los Angeles (141 and 142) are largest, the node for New York (143) is next largest and the node for Las Vegas (140) is smallest.

Among other advantages, it is readily appreciated that an Instance Graph can provide at least the following features to enhance a user's ability to appreciate the centrality of certain items in shaping opinion:

Two or more items that have a large amount of "Influence" may tend to refer to each other, and will therefore tend to be placed in closer proximity to each other than less influential items. This is shown, for example, in FIG. 1B, where San Francisco and Los Angeles (nodes 111 and 112) are closer to each other than any other pair of nodes. Also, frequent reference, between a pair of nodes, can also be appreciated by the compound edges between them.

If an item "x" has a greater number of edges connected to it, relative to one or more other items, this can often be readily observed. Such observations can be further enhanced by the techniques described above, where the display of the node representing "x" can be made indicative, for example by its diameter, of its influence.

For a variety of reasons, it can be the case that a user wishes to produce an Instance Graph in an incremental manner. For example, a user may have a particularly strong interest in understanding preferences as they relate to a subset of the items that fit a particular category. Let us call this subset of items "subset 0." An initial Instance Graph display can include just the items of subset 0 and those items (called the "level 1 items") directly connected to them.

The incremental display process can then continue as follows:
1. User picks a subset of the level 1 items, called subset 1, for which their further connectivity is of interest. (Subset 1 can include all level 1 items.)
2. Items of a level 2 are identified (defined as those items directly connected to a subset 1 item and not already a member of level 1 or subset 0).
3. Items of level 2 are added to the Instance Graph display.

In general, an incremental display process can be described as follows:
1. User picks a subset of the level n items, called subset n, for which their further connectivity is of interest. (Subset n can include all level n items.)
2. Items of a level n+1 are identified (defined as those items directly connected to a subset n item and not already a member of level n, level n−1, . . . level 1 or subset 0).
3. Items of level n+1 are added to the Instance Graph display.

An example use of incremental Instance Graph generation is as follows: the manager or marketer for a brand "B" will often wish to understand competing brands in the context of how they relate to "B." For the example Instance Graph of FIG. 1B, assume a person is responsible for the marketing of New York City. In accordance with Section 1, an Instance Superset 1105 can be produced, by Instance Generation 1110, for all four cities of interest. Instance Selection 1130, however, can be accomplished with just "New York" as the query (i.e., "New York" node 113, of FIG. 1B, corresponds to "subset 0" in the above discussion of incremental Instance Graph production). The frame instance data produced identifies just San Francisco node 111 and Los Angeles node 112 as the "level 1" items. If San Francisco is selected as the item of subset 1, a re-application of Instance Selection 1130 will result in an identification of Las Vegas node 110 as the level 2 item.

3 Instance Plot

While the Instance Graph described in the previous section is comprised of nodes and edges, the Instance Plot of this section uses a coordinate system.

An Instance Plot is based on the three graph theory terms introduced in the last sub-section, plus the following:
3. Net Outdegree: the Outdegree of a node minus its Indegree.

"Net Outdegree" can also be described as "Net Preference," since it measures the extent to which an item, as represented by a node, appears as a Preferred Item more often than as an Item.

Table II (below) is the same as Table I of the previous section, except an additional "Net Preference" column is added (and "Degree" is renamed "Influence").

TABLE II

| Node | Outdegree | Indegree | Influence | Net Preference |
| --- | --- | --- | --- | --- |
| San Francisco | 2 | 6 | 8 | −4 |
| Los Angeles | 5 | 3 | 8 | +2 |
| New York | 2 | 1 | 3 | +1 |
| Las Vegas | 1 | 0 | 1 | +1 |

An example Instance Plot, using Table II, is shown in FIG. 1E. As can be seen, it is based on plotting an item (in this case, a USA city) according to its Net Preference and Influence values.

An Instance Plot can make clear that an Item with a great deal of Influence does not necessarily have the highest Net Preference. This is shown, for example, in FIG. 1E, where San Francisco and Los Angeles are both listed as having equal Influence. San Francisco, however, is shown as having a lower Net Preference than Los Angeles. Even for Los Angeles, it's Net Preference of +2 is not as high as one might expect, given how much greater it's Influence is, than that of New York or Las Vegas.

Thus, while an item that plots in the extreme upper-right corner of an Instance Plot is probably a "leader," in its category of items, an item could still be a category leader and plot in the extreme lower-right corner. An explanation for this result is as follows: because an item "L" is already recognized as its category's leader, customers/users of "L" know they are communicating little additional knowledge by expressing a positive opinion on "L." In contrast, customers/users know that comparisons with "L," of non-category leaders, can be very useful to others since "L" serves as a kind of common standard.

4 Additional Uses

While the Instance Graph and Plot have been described in relation to understanding preferences, in relation to online opinion data, it can be readily appreciated that they can be applied to any frame instance data where the frame establishes directional relationships.

For example, the '837 Application presents frames for Cause and Effect. Specifically, the '837 Application relates to the exploration of information about healthcare. The search system of the '837 Application permits the causes or effects, of a medical condition, to be found. Such causes or effects are, in themselves, medical conditions and can therefore be the subject of further cause or effect searching. While the '837 Application permits, in effect, search of a directed causality graph between medical conditions, it provides no techniques by which an actual directed graph can be realized and displayed to a user. Herein are presented some such display techniques.

5 Computing Environment

FIG. 6 depicts an example production-level computer system design in which the techniques described herein can be applied.

Cloud 630 represents data, such as online opinion data, available via the Internet. Computer 610 can execute a web crawling program, such as Heritrix, that finds appropriate web pages and collects them in an input database 600. An alternative, or additional, route for collecting input database 600 is to use user-supplied data 631. For example, such user-supplied data 631 can include the following: any non-volatile media (e.g., a hard drive, CD-ROM or DVD), record-oriented databases (relational or otherwise), an Intranet or a document repository. A computer 611 can be used to process (e.g., reformat) such user-supplied data 631 for input database 600.

Computer 612 can perform the indexing needed for formation of an appropriate FBDB. The indexing phase scans the input database for sentences that refer to an organizing frame, produces a snippet around each such sentence and adds the snippet to the appropriate frame-based database. FIG. 6 depicts an example frame-based database 601. For the example frame instance system as described in Section 1, an FBDB based on the Preference Frame could be produced.

Databases 620 and 621 represent, respectively, stable "snapshots" of databases 600 and 601. Databases 620 and 621 can provide stable databases that are available to service requests to produce graphical representations (i.e., Instance Plots and/or Instance Graphs), in response to requests entered by a user at computer 633. Such user requests can travel over the Internet (indicated by cloud 632) to a web interfacing computer 614 that can also run a firewall program. Computer 613 can receive the user query, produce frame instance data from the contents of the appropriate FBDB (e.g., FBDB 621), produce a graphical representation of the frame instance data, and transmit the graphical representation back to computer 633 for display to the user. The results from computer 613 can also be stored in a database 602 that is private to the individual user. When it is desired to see the snippets, on which a graphical representation is based, FBDB 621 is available. If it is further desired to see the full documents, on which snippets are based, input database 620 is also available to the user.

In accordance with what is ordinarily known by those in the art, computers 610, 611, 612, 613, 614 and 633 contain computing hardware, and programmable memories, of various types.

The information (such as data and/or instructions) stored on computer-readable media or programmable memories can be accessed through the use of computer-readable code devices embodied therein. A computer-readable code device can represent that portion of a device wherein a defined unit of information (such as a bit) is stored and/or read.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for graphically presenting frame instance data, comprising:
   determining, as a result of computing hardware and programmable memory, a first set of logical forms, each logical form representative of a corresponding unit of natural language in a first source of computer-accessible content, wherein at least some logical forms, of the first set of logical forms, include representation of a logical verb, a logical subject, and a logical object;
   producing an instance of a frame, as a result of computing hardware and programmable memory, each time a frame extraction rule is satisfied by a member of the first set of logical forms, wherein each instance produced is added to a first set of frame instances;
   producing, performed at least in part with a configuration of computing hardware and programmable memory, a first graph, inclusive of directed edges, by representing each member, of the first set of frame instances, by a directed edge between two nodes;
   merging, performed at least in part with a configuration of computing hardware and programmable memory, a first node and a second node if a first role value, represented by the first node, is sufficiently similar to a second role value, represented by the second node;
   determining, performed at least in part with a configuration of computing hardware and programmable memory, for each node, an outdegree, indegree and degree;
   determining, performed at least in part with a configuration of computing hardware and programmable memory, for each node, a preference as a function of outdegree and indegree; and
   displaying, performed at least in part with a configuration of computing hardware and programmable memory, each node, in a coordinate system, using its degree and preference.

2. The method of claim 1, wherein determining the preference includes, at least, subtraction of the indegree from the outdegree.

3. The method of claim 1, wherein the coordinate system is Cartesian, using one axis for degree and another for preference.

4. A data processing system, comprising:
   one or more processors and programmable memory, wherein the system is configured:
   to accomplish determining a first set of logical forms, each logical form representative of a corresponding unit of natural language in a first source of computer-accessible content, wherein at least some logical forms, of the first set of logical forms, include representation of a logical verb, a logical subject, and a logical object;
   to accomplish producing an instance of a frame each time a frame extraction rule is satisfied by a member of the first set of logical forms, wherein each instance produced is added to a first set of frame instances;
   to accomplish producing a first graph, inclusive of directed edges, by representing each member, of the first set of frame instances, by a directed edge between two nodes;

to accomplish merging a first node and a second node if a first role value, represented by the first node, is sufficiently similar to a second role value, represented by the second node; and to accomplish determining, for each node, an outdegree, indegree and degree;

to accomplish determining, for each node, a preference as a function of outdegree and indegree; and to accomplish displaying, each node, in a coordinate system, using its degree and preference.

5. The system of claim 4, wherein determining the preference includes, at least, subtraction of the indegree from the outdegree.

6. The system of claim 4, wherein the coordinate system is Cartesian, using one axis for degree and another for preference.

* * * * *